United States Patent
Mukai

(10) Patent No.: US 8,432,401 B2
(45) Date of Patent: Apr. 30, 2013

(54) IMAGE PROCESSING APPARATUS, IMAGE PROCESSING METHOD, AND IMAGE PROCESSING PROGRAM

(75) Inventor: Tomohiko Mukai, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 67 days.

(21) Appl. No.: 13/145,648

(22) PCT Filed: Apr. 19, 2011

(86) PCT No.: PCT/JP2011/002280
§ 371 (c)(1),
(2), (4) Date: Sep. 13, 2011

(87) PCT Pub. No.: WO2011/142084
PCT Pub. Date: Nov. 17, 2011

(65) Prior Publication Data
US 2011/0316860 A1    Dec. 29, 2011

(30) Foreign Application Priority Data

May 10, 2010 (JP) .................................. 2010-108844

(51) Int. Cl.
*G06T 13/00* (2006.01)
*G09G 5/00* (2006.01)

(52) U.S. Cl.
USPC ............ 345/473; 345/474; 345/581; 345/586

(58) Field of Classification Search .................. 345/581, 345/473
See application file for complete search history.

(56) References Cited

U.S. PATENT DOCUMENTS

| | | | |
|---|---|---|---|
| 6,191,798 B1 | 2/2001 | Handelman et al. | |
| 6,697,071 B2 | 2/2004 | Iino et al. | |
| 6,947,046 B2 | 9/2005 | Nimura et al. | |
| 7,804,502 B2 | 9/2010 | Azuma | |
| 7,868,889 B2 | 1/2011 | Azuma | |
| 8,144,148 B2 * | 3/2012 | El Dokor et al. | ............. 345/424 |
| 2003/0043154 A1 * | 3/2003 | Nimura et al. | ................ 345/474 |

(Continued)

FOREIGN PATENT DOCUMENTS

| | | |
|---|---|---|
| JP | 10-021419 | 1/1998 |
| JP | 2003-062326 | 3/2003 |

(Continued)

OTHER PUBLICATIONS

International Search Report in PCT/JP2011/002280, dated May 5, 2011.

(Continued)

*Primary Examiner* — James A Thompson
*Assistant Examiner* — Tapas Mazumder
(74) *Attorney, Agent, or Firm* — Greenblum & Bernstein, P.L.C.

(57) ABSTRACT

[Problems] An appropriate motion expression in which a processing load on image processing for a motion of a character is reduced and a predetermined site of the character is in contact with a contact allowed object appropriately is carried out.
[Means for solving the Problems] An image processing apparatus 100 generates motion information by blending plural kinds of sample motion information with an arbitrary blend ratio; detects, on the basis of the generated motion information, a reachable position P when a character C is operated; associates coordinate information indicating the detected reachable position P with the blend ratio; causes virtual spheres B, which are arranged within a range in which the reachable position P exists in the virtual space, to correspond to the reachable position P; outputs a virtual sphere according to a state of the character C in the virtual space on the basis of virtual sphere information; receives selection of a virtual sphere that is in contact with the contact allowed object; and controls an action of the character C on the basis of motion information corresponding to a blend ratio associated with the coordinate information indicating the reachable position P, which is caused to correspond to the virtual sphere for which the selection is received.

5 Claims, 7 Drawing Sheets

U.S. PATENT DOCUMENTS

| | | | |
|---|---|---|---|
| 2007/0139416 A1* | 6/2007 | Azuma | 345/473 |
| 2009/0295809 A1 | 12/2009 | Girard | |
| 2010/0278393 A1* | 11/2010 | Snook et al. | 382/107 |
| 2010/0304808 A1* | 12/2010 | Kawabata | 463/2 |
| 2012/0049450 A1* | 3/2012 | Agamawi | 273/153 S |

FOREIGN PATENT DOCUMENTS

| | | |
|---|---|---|
| JP | 2003-067773 | 3/2003 |
| JP | 2007-102503 | 4/2007 |

OTHER PUBLICATIONS

Extended European Search Report from European Patent Office (EPO) in European Patent Application No. 11731621.6, dated Feb. 7, 2013.

Yahya Aydin et al., "Database guided computer animation of human grasping using forward and inverse kinematics", Computers & Graphics, Elsevier Science Ltd., GB, vol. 23, No. 1, pp. 145-154, XP004161355, ISSN: 0097-8493 (Feb. 1, 1999).

* cited by examiner

Fig. 2

VIRTUAL SPHERE INFORMATION

| SPHERE NUMBER | CORRESPONDING CHARACTER | TYPE | CENTRAL COORDINATE | SPHERICAL RADIUS | BLEND RATIO | CONTACT | ... |
|---|---|---|---|---|---|---|---|
| 0001 | CHARACTER 01 | WALKING | (x1,Y1) | R1 | P1 | 1 | ... |
| 0002 | | | (x2,Y2) | R1 | P2 | 1 | ... |
| 0003 | | | (x3,Y3) | R1 | P3 | 0 | ... |
| ⋮ | ⋮ | ⋮ | ⋮ | ⋮ | ⋮ | ⋮ | ⋮ |

IMAGE PROCESSING APPARATUS, IMAGE PROCESSING METHOD, AND IMAGE PROCESSING PROGRAM

CROSS REFERENCE TO RELATED APPLICATIONS

The present application is a U.S. national phase application under 35 U.S.C. §371 of PCT Application No. PCT/JP2011/002280, filed on Apr. 19, 2011, and claims priority to and incorporates by reference Japanese Patent Application No. 2010-108844, filed on May 10, 2010.

TECHNICAL FIELD

The present invention relates to an image processing apparatus, an image processing method and an image processing program for generating motions of images (a video game character and the like) expressed by three-dimensional or two-dimensional computer graphics, for example.

BACKGROUND ART

Various video games including a video game called an RPG (role-playing game: a game in which a player plays a role of a character in a world of the game, and accomplishes a predetermined object while enjoying a process that the character grows through various experiences) and a simulation game have been provided.

Heretofore, various kinds of image processing technologies have been proposed which allow a motion of a character that appears in such a video game or the like to be expressed variedly (for example, Patent Literatures 1 and 2).

Prior Art Literature

Patent Literature

Patent Literature 1: Japanese Patent Application Publication No. 2003-62326

Patent Literature 2: Japanese Patent Application Publication No. 2003-67773

SUMMARY OF THE INVENTION

Problems to be Solved by the Invention

However, in order to express a motion of the character composed of polygons more appropriately in response to a change of a field, much calculation is required, and this leads to an increase in a processing load. For this reason, in the conventional image processing technology, for example, surface data are collected in advance over a wide range and calculation result obtained by calculating it in advance is used, whereby the processing load is reduced and speeding up is achieved. However, it has been desired to reduce the processing load further.

On the other hand, as for a home-use game machine or the like, its processing power is limited. Ina case where surface data on a surface of the ground over a wide range or the like is used, there has been a problem that a processing load exceeding processing power is applied even though preliminary calculation has been carried out.

Further, such a problem is not limited to a technology field regarding a video game, and it has become a problem in the overall technology fields associated with generation of computer graphics and animations.

The present invention has been made in order to solve the problem described above, and it is an object of the present invention to appropriately express a motion of a character, and to reduce a processing load in image processing.

Means for Solving the Problems

An image processing apparatus according to the present invention is directed to an image processing apparatus that generates a motion of a character by controlling an action of the character in a virtual space, the image processing apparatus including: a sample motion information storage section that stores sample motion information therein, the sample motion information indicating a sample motion that serves as a base for a motion of the character; a motion information storage section that stores motion information therein, the motion information indicating an action of the character; a motion blender that generates motion information by blending plural pieces of the sample motion information stored in the sample motion information storage section with an arbitrary blend ratio; a motion information registerer that registers the motion information generated by the motion blender in the motion information storage section; a reachable position detector that detects, on the basis of the motion information generated by the motion blender, a reachable position of a predetermined site of the character at the end of movement when the character is caused to move; a blend ratio associator that associates coordinate information with the blend ratio, the coordinate information indicating the reachable position detected by the reachable position detector; a virtual sphere arranger that arranges a plurality of spheres in a range in which the reachable position exists in the virtual space; a virtual sphere corresponder that causes virtual spheres to correspond to the reachable position, the virtual spheres being the spheres arranged by the virtual sphere arranger; a virtual sphere information registerer that registers virtual sphere information in a virtual sphere information storage section for storing the virtual sphere information, the virtual sphere information being information on the virtual spheres caused to correspond to the reachable position by the virtual sphere corresponder; and a character controller that controls an action of the character in the virtual space on the basis of the motion information stored in the motion information storage section, wherein the character controller includes: an outputter that outputs the virtual spheres in accordance with a state of the character in the virtual space on the basis of the virtual sphere information stored in the virtual sphere information storage section; a contact determiner that determines whether there is a virtual sphere that is in contact with a contact allowed object among the virtual spheres outputted by the outputter, the contact allowed object being an object with which the character can come into contact; and a selection receiver that receives selection of the virtual sphere determined by the contact determiner to be in contact with the contact allowed object, and wherein the character controller controls the action of the character on the basis of the motion information corresponding to the blend ratio associated with the coordinate information, the coordinate information indicating the reachable position caused to correspond to the virtual sphere for which the selection receiver receives the selection.

By configuring it as described above, it is possible to appropriately express a motion of a character, and to reduce a processing load in image processing.

The image processing apparatus according to the present invention may be configured so that the character controller includes: a blend ratio specifier that specifies the blend ratio according to the virtual sphere for which the selection receiver receives the selection; a blend ratio corrector that corrects, on the basis of the coordinate information associated with the blend ratio specified by the blend ratio specifier and a position of the contact allowed object in the virtual space, the blend ratio so that the motion information according to the blend ratio meets a predetermined condition; and a motion information specifier that specifies the motion information according to the blend ratio corrected by the blend ratio corrector, wherein the character controller controls the action of the character on the basis of the motion information specified by the motion information specifier.

The image processing apparatus according to the present invention may be configured so that the character controller includes: a virtual distance specifier that specifies a virtual distance from the reachable position to the position of the contact allowed object in the virtual space, the reachable position being indicated by the coordinate information associated with the blend ratio specified by the blend ratio specifier; and a correction amount specifier that specifies the amount of correction of the blend ratio required to bring the reachable position in line with the position of the contact allowed object on the basis of the virtual distance specified by the virtual distance specifier, and wherein the blend ratio corrector corrects the blend ratio in accordance with the amount of correction specified by the correction amount specifier.

Further, an image processing method according to the present invention is directed to an image processing method of generating a motion of a character by controlling an action of the character in a virtual space, the processing method including: motion blend processing for generating motion information by blending plural pieces of sample motion information stored in a sample motion information storage section with an arbitrary blend ratio, sample motion information storage section that stores sample motion information therein, the sample motion information indicating a sample motion that serves as a base for a motion of the character; motion information registering processing for registering the motion information generated in the motion blend processing in a motion information storage section, the motion information storage section storing the motion information therein, the motion information indicating an action of the character; reachable position detecting processing for detecting, on the basis of the motion information generated in the motion blend processing, a reachable position of a predetermined site of the character at the end of movement when the character is caused to move; blend ratio associating processing for associating coordinate information with the blend ratio, the coordinate information indicating the reachable position detected in the reachable position detecting processing; virtual sphere arranging processing for arranging a plurality of spheres in a range in which the reachable position exists in the virtual space; virtual sphere corresponding processing for causing virtual spheres to correspond to the reachable position, the virtual spheres being the spheres arranged in the virtual sphere arranging processing; virtual sphere information registering processing for registers virtual sphere information in a virtual sphere information storage section for storing the virtual sphere information, the virtual sphere information being information on the virtual spheres caused to correspond to the reachable position in the virtual sphere corresponding processing; and character controlling processing for controls an action of the character in the virtual space on the basis of the motion information stored in the motion information storage section, wherein the character control processing includes: outputting processing for outputting the virtual spheres in accordance with a state of the character in the virtual space on the basis of the virtual sphere information stored in the virtual sphere information storage section; contact determining processing for determines whether there is a virtual sphere that is in contact with a contact allowed object among the virtual spheres outputted in the outputting processing, the contact allowed object being an object with which the character can come into contact; and selection receiving processing for receiving selection of the virtual sphere determined in the contact determining processing to be in contact with the contact allowed object, and wherein the action of the character is controlled on the basis of the motion information corresponding to the blend ratio associated with the coordinate information, the coordinate information indicating the reachable position caused to correspond to the virtual sphere for which the selection is received in the selection receiving processing.

Moreover, an image processing program according to the present invention is directed to an image processing program of generating a motion of a character by controlling an action of the character in a virtual space, the image processing program causing a computer to execute: motion blend processing for generating motion information by blending plural pieces of sample motion information stored in a sample motion information storage section with an arbitrary blend ratio, sample motion information storage section that stores sample motion information therein, the sample motion information indicating a sample motion that serves as a base for a motion of the character; motion information registering processing for registering the motion information generated in the motion blend processing in a motion information storage section, the motion information storage section storing the motion information therein, the motion information indicating an action of the character; reachable position detecting processing for detecting, on the basis of the motion information generated in the motion blend processing, a reachable position of a predetermined site of the character at the end of movement when the character is caused to move; blend ratio associating processing for associating coordinate information with the blend ratio, the coordinate information indicating the reachable position detected in the reachable position detecting processing; virtual sphere arranging processing for arranging a plurality of spheres in a range in which the reachable position exists in the virtual space; virtual sphere corresponding processing for causing virtual spheres to correspond to the reachable position, the virtual spheres being the spheres arranged in the virtual sphere arranging processing; virtual sphere information registering processing for registers virtual sphere information in a virtual sphere information storage section for storing the virtual sphere information, the virtual sphere information being information on the virtual spheres caused to correspond to the reachable position in the virtual sphere corresponding processing; and character controlling processing for controls an action of the character in the virtual space on the basis of the motion information stored in the motion information storage section, wherein in the character control processing the image processing program causes the computer to execute: outputting processing for outputting the virtual spheres in accordance with a state of the character in the virtual space on the basis of the virtual sphere information stored in the virtual sphere information storage section; contact determining processing for determines whether there is a virtual sphere that is in contact with a contact allowed object among the virtual spheres outputted in the outputting processing, the contact allowed object being an object with which the character can come into contact; and selection receiving processing for receiving selection of the virtual sphere determined in the contact determining processing to be in contact with the contact allowed object, and wherein the image processing program causes the computer to execute: processing for controlling the action of the character on the basis of the motion information corresponding to the blend ratio associated with the coordinate information, the coordinate information indicating the reachable position caused to correspond to the virtual sphere for which the selection is received in the selection receiving processing.

Effects of the Invention

According to the present invention, it is possible to express a motion of a character appropriately, and it becomes possible to reduce a processing load in image processing.

BRIEF DESCRIPTION OF THE DRAWINGS

FIG. 2 is an explanatory drawing showing an example of a storage state of virtual sphere information.

MODE FOR CARRYING OUT THE INVENTION

Hereinafter, an example of one embodiment according to the present invention will be described with reference to the appending drawings.

Figure 1:
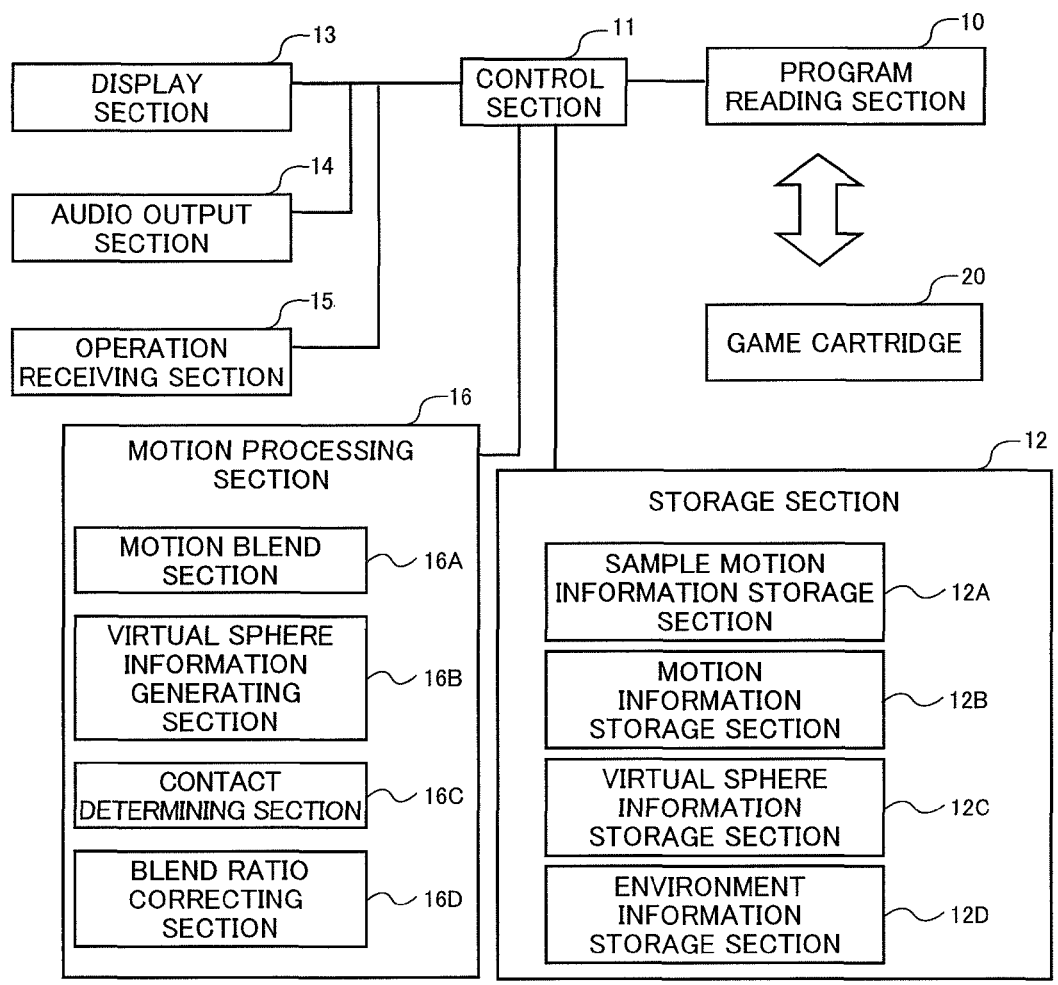
FIG. 1 is a block diagram showing a configuration example of an image processing apparatus according to one embodiment of the present invention.

FIG. 1 is a block diagram showing a configuration example of an image processing apparatus 100 according to one embodiment of the present invention. As shown in FIG. 1, the image processing apparatus 100 includes a program reading section 10, a control section 11, a storage section 12, a display section 13, an audio output section 14, an operation receiving section 15, and a motion processing section 16.

The program reading section 10 has a function to readout a necessary program from a storage medium into which a storage medium, in which various kinds of programs are stored, is embedded. In this regard, in the present embodiment, the program reading section 10 has a mounting section into which a game cartridge 20, in which a game program is stored, is detachably mounted.

The control section 11 carries out the game program (including an image processing program) read out from the program reading section 10, and carries out various controls such as an action control for controlling an action (motion) of a character, and an audio control for outputting sound effects in accordance with a motion carried out by the character.

The storage section 12 is a storage medium for storing programs and various kinds of data necessary for generating a motion according to a surrounding environment of the character (for example, the degree of slope of the ground on which the character is positioned in a virtual space) (that is, for generating motion information, and generating a motion of the character in the virtual space by controlling the character on the basis of the generated motion information by means of the control section 11). The storage section 12 is configured by a nonvolatile memory such as RAM, for example. In the storage section 12, various kinds of information to be registered and updated in accordance with virtual sphere information generating processing (will be described later) and various kinds of information used in a game and read out from the storage medium embedded in the game cartridge 20 are stored.

In the present embodiment, the storage section 12 includes: a sample motion information storage section 12a; a motion information storage section 12b; a virtual sphere information storage section 12c; and an environment information storage section 12d.

The sample motion information storage section 12a is a storage medium for storing sample motion information indicating sample motions each of which serves as a basis for a motion carried out by the character.

In the present embodiment, the sample motion information is information for displaying, in accordance with body information of the character (a body height, a body weight, appearance and the like), an action of the character on a display screen with a three-dimensional or two-dimensional state, and is information containing polygon data and bones that construct the character.

The motion information storage section 12b is a storage medium for storing motion information to which the control section 11 refers when the control section 11 controls the action of the character. In the present embodiment, the motion information is generated by causing a plurality of sample motions to be blended (blending) by means of the motion blend section 16a.

In this regard, the information stored as the motion information is not limited to one in which the plurality of sample motions are caused to be blended, and may be configured so that a single sample motion is stored as a motion, for example. In this case, it may be configured so that it is treated as one in which two sample motions are blended in a ratio of ten to zero, for example.

The virtual sphere information storage section 12c is a storage medium for storing virtual sphere information that is information on a virtual sphere used to select appropriate motion information from plural kinds of motion information in accordance with a state of the character (for example, "during stopping", "during movement" or the like), a surrounding environment of the character, operational inputs from a user or the like. Here, the virtual sphere means a predetermined sphere (or a group of spheres) virtually arranged in the virtual space in accordance with a state of the character. The virtual sphere and the virtual sphere information will be described in detail in explanation for the virtual sphere generating processing (will be described later) and motion generating processing (see FIGS. 3 and 7).

FIG. 2 is an explanatory drawing showing an example of a storage state of the virtual sphere information in the virtual sphere information storage section 12c. As shown in FIG. 2, the virtual sphere information contains: a sphere number for uniquely specifying a virtual sphere; a character to which the virtual sphere corresponds; a type of motion that is caused to correspond to the virtual sphere; a central coordinate indicating a central position of the virtual sphere in accordance with a position of the character in the virtual space; a radius of the virtual sphere; a blend ratio of sample motions constituting a motion caused to correspond to the virtual sphere; and a contact flag.

The environment information storage section 12d is a storage medium for storing information on the virtual space in which the character exists. In the present embodiment, the environment information storage section 12d contains information (for example, the ground geometry) indicating a contact allowed object (for example, the ground or the like) that is an object with which the character can come into contact in the virtual space.

The display section 13 is a display device for displaying a game screen in response to operations by the user in accordance with control by the control section 11. The display section 13 is constructed by a liquid crystal display, for example.

The audio output section 14 outputs audio in response to operations by the user or an action of the character in accordance with control by the control section 11.

The operation receiving section 15 receives operational signals in response to a user operation from a controller configured by a plurality of buttons, a mouse and the like, and notifies the control section 11 of its result.

The motion processing section 16 has a function to blend plural kinds of sample motion information with an arbitrary blend ratio, and a function to carryout blend ratio correcting processing in motion generating processing (will be described later) and the like (see FIG. 7).

In the present embodiment, the motion processing section 16 includes: a motion blend section 16a; a virtual sphere information generating section 16b; a contact determining section 16c; and a blend ratio correcting section 16d.

The motion blend section 16a has a function to generate motion information by blending a plurality of sample motions with an arbitrary blend ratio, and to register the generated motion information into the motion information storage section 12b. In this regard, with respect to blend processing of sample motions, a known motion blending method of carrying out processing to cause a plurality of motions to synchronize with each other and processing to interpolate posture of an action every timeframe is used. Thus, a detailed explanation thereof is omitted herein.

The virtual sphere information generating section 16b has a function to carry out the virtual sphere information generating processing for generating the virtual sphere information. The virtual sphere information generating processing will be described later in detail (see FIG. 3).

The contact determining section 16c has a function to determine whether the virtual sphere arranged in the virtual space is in contact with a border line (for example, the ground geometry or the like) between an area in which the character is allowed to be operated and an area in which the character is not allowed or not. In this regard, the case of using a method of comparing coordinates in the virtual space as a method for contact determination will be described as an example in the present embodiment.

The blend ratio correcting section 16d has a function to carry out the blend ratio correcting processing in the motion generating processing (will be described later) (see FIG. 7). Here, the blend ratio correcting processing is processing to correct a blend ratio so that a toe of a character C is caused to come into contact with the ground accurately, for example, when the motion generated in accordance with the blend ratio is carried out. In the present embodiment, since a method using a known kriging method is utilized, a detailed explanation thereof is omitted herein.

Next, an operation of the image processing apparatus 100 according to the present invention will be described. In this regard, with respect to any action or processing with no relationship to the present invention, its content may be omitted.

The image processing apparatus 100 according to the present embodiment blends the sample motion information stored in the sample motion information storage section 12a in advance with an arbitrary ratio, thereby carrying out processing to generate a motion when a 3D CG character moves on a slope, stairs or the like in the virtual space.

Hereinafter, a walking motion of a humanoid character C will be described as an example. In this regard, in the present embodiment, an interval from the point at which one foot of the character C gets out from the ground to the point at which it comes into contact with the ground is set to a walking motion for one step. Namely, "coming into contact with the ground, getting off therefrom, moving, landing, and coming into contact with the ground" are set as one walking cycle, and a motion of the character is determined for every walking cycle. For example, the image processing apparatus 100 searches a next moving motion of a right foot when a left foot of the character C lands the ground, and calculates a further next moving motion of the left foot when the right foot lands the ground.

Further, the processing carried out by the image processing apparatus 100 is divided into two kinds including preliminary calculation for creating necessary information in advance before operational inputs by the user are received to cause the character to move and calculation during execution carried out when the character is caused to move in response to operational inputs by the user.

Figure 3:
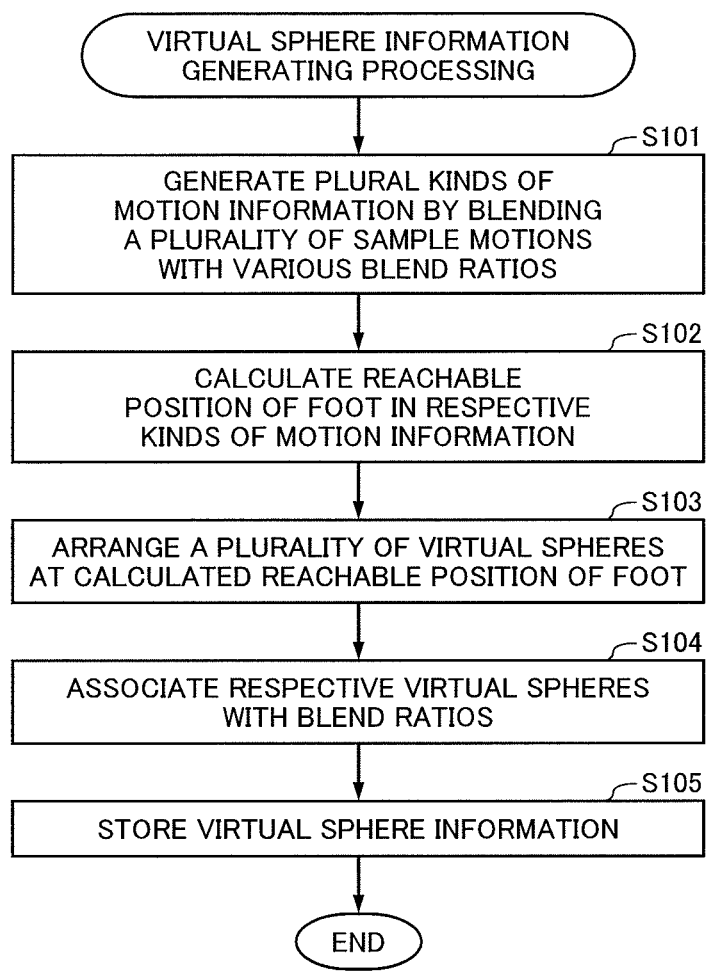
FIG. 3 is a flowchart showing an example of virtual sphere information generating processing.

FIG. 3 is a flowchart showing an example of virtual sphere information generating processing that the image processing apparatus 100 carries out as preliminary calculation. In the virtual sphere information generating processing, processing to generate virtual sphere information in accordance with a kind of a motion of the character C is carried out.

Figure 4:
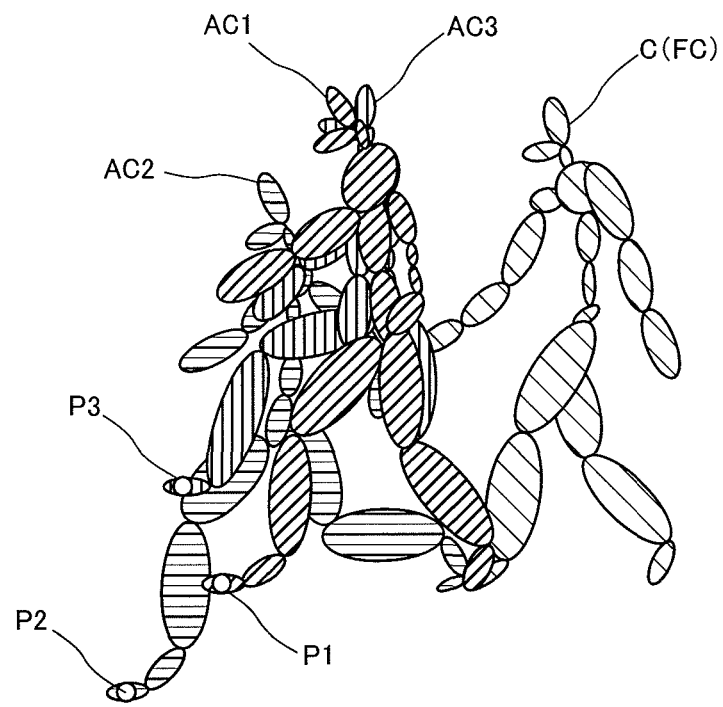
FIG. 4 is an explanatory drawing for explaining the virtual sphere information generating processing.
Figure 5:
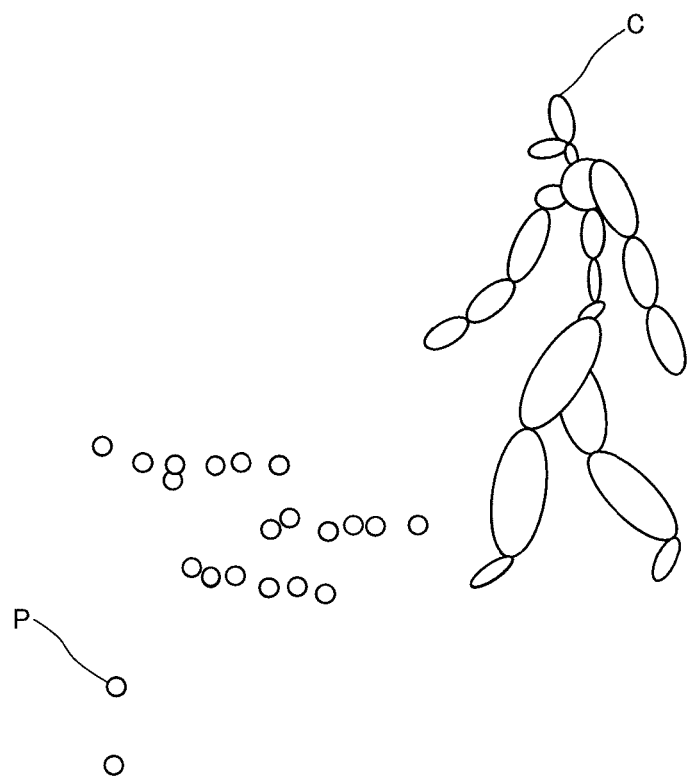
FIG. 5 is an explanatory drawing for explaining the virtual sphere information generating processing.
Figure 6:
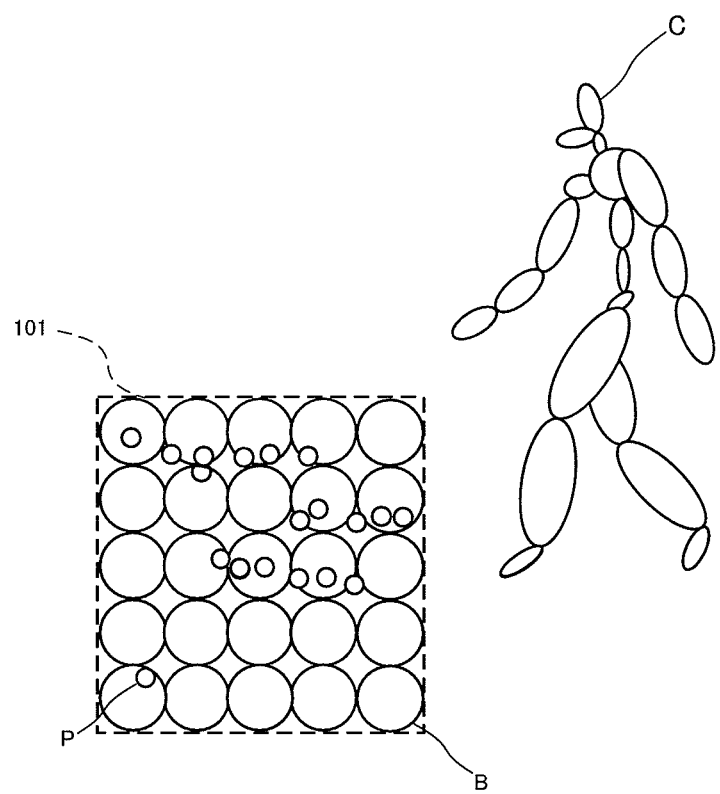
FIG. 6 is an explanatory drawing for explaining the virtual sphere information generating processing.

Here, a concept of the processing carried out in the virtual sphere information generating processing according to the present embodiment will first be described. FIGS. 4, 5 and 6 are explanatory drawings for explaining the virtual sphere information generating processing. In this regard, each of FIGS. 4, 5 and 6 is shown by a two-dimensional drawing for brief description.

In order to generate virtual sphere information, the image processing apparatus 100 blends combination of a plurality of sample motions according to a walking motion with various ratios (that is, blend ratios) from an initial posture FC of the character C as shown in FIG. 4, and derives reachable positions P1, P2, P3 of a foot of the character C (in FIG. 4, postures AC1, AC2, AC3 of the character C) with respective blend ratios.

FIG. 5 shows a plurality of reachable positions P (including P1, P2 and P3) derived in accordance with rules stored in the storage section 12 in advance. By configuring it in this manner, it is possible to obtain motion information with small differences by adjusting the blend ratios without increasing the amount of the sample motion information.

Next, the image processing apparatus 100 virtually arranges a plurality of spheres in the range in which the respective reachable positions P of the foot of the character C exist, and associates the blend ratios with the arranged spheres (virtual spheres). This makes it possible for the control section 11 to refer to the blend ratio so that the toe is arranged at the position when an arbitrary virtual sphere is specified, for example.

Next, an operation of the image processing apparatus 100 in the virtual sphere information generating processing will be described (see FIG. 3).

In the virtual sphere information generating processing, the control section 11 generates plural kinds of motion information by blending a plurality of sample motions in accordance with rules (for example, "the widest length of stride and the narrowest length of stride are blended with a blend ratio obtained by changing the blend ratio by one tenth, such as nine to one, eight to two, seven to three, . . . , among sample motions according to the walking motion") stored in the storage section 12 in advance by means of the motion blend section 16*a* (Step S101). In this regard, the control section 11 may be configured so as to select motion information used in the virtual sphere information generating processing among the motion information stored in the motion information storage section 12*b* in advance. Further, in a case where motion information is generated, the control section 11 may be configured so as to receive selection of the plurality of sample motions by the user by means of the motion blend section 16*a*. Further, the control section 11 may be configured so as to support selection of a sample motion by the user by configuring it to display a blendable sample motion on the display screen on the basis of priorities set to the respective sample motions in advance (or in a random manner), for example.

When the plural pieces of motion information are generated by means of the motion blend section 16*a*, the control section 11 calculates the reachable position P (that is, a position of the foot of the character C at the time when the walking motion is terminated) of the character C in each of the pieces of motion information generated by the virtual sphere information generating section 16 (Step S102).

When each of the reachable positions P is calculated, the control section 11 stores, by means of the virtual sphere information generating section 16*b*, information (coordinate information) indicating the reachable position P with respect to the position of the initial posture FC of the character C in the storage section 12 so as to cause it correspond to the blend ratio, and arranges the plurality of virtual spheres in a range 101 in which the reachable positions P exist (see FIG. 6) (Step S103).

In the present embodiment, the virtual sphere information generating section 16*b* uniformly arranges virtual spheres each having a predetermined radius within the virtual space at which the foot of the character can reach. Thus, the product of the radius of the virtual sphere and the total number of the virtual spheres becomes constant. However, the amount of data generated by the preliminary calculation is linearly increased in accordance with an increase in the total number of the virtual spheres. Therefore, it is required to delete the total number of the virtual spheres by making their sphere radius larger.

Therefore, in the present embodiment, as shown in FIG. 6, the inside of the range 101 in which the reachable positions P exist is paved with the plurality of virtual spheres B with the same radius.

When the virtual spheres B are arranged, the control section 11 associates, by means of the virtual sphere information generating section 16*b*, the respective virtual spheres B with the blend ratios caused to correspond to the respective reachable positions P (that is, assigns the blend ratios to the respective reachable positions P) (Step S104).

In the present embodiment, the virtual sphere information generating section 16*b* stores the blend ratio, which is caused to correspond to the reachable position P positioned inside the virtual sphere B in the virtual sphere information storage section 12*c* so as to be associated with the virtual sphere B.

Namely, the virtual sphere information generating section 16*b* generates the virtual sphere information, which is information on the virtual sphere that is caused to correspond to the reachable position P associated with the blend ratio, by associating the virtual sphere with the blend ratio, and registers it in the virtual sphere information storage section 12*c*.

In this regard, a blend ratio is not associated with a virtual sphere B in which any reachable position P is not positioned, and such a virtual sphere B becomes a virtual sphere that is not to be selected in the motion generating processing (will be described later, see FIG. 7). Further, in a case where the plurality of reachable positions P are positioned inside one virtual sphere B, the virtual sphere information generating section 16*b* may be configured so as to calculate an average value of the blend ratios, which are respectively caused to correspond to the plurality of reachable positions P, and to store it, for example.

When the respective virtual spheres are associated with the blend ratios, the control section 11 stores, by means of the virtual sphere information generating section 16*b*, the virtual sphere information specifying the respective virtual spheres B associated with the blend ratios in the virtual sphere information storage section 12*c* (Step S105), and terminates the processing herein. Therefore, the respective virtual spheres B are stored as ones those belong to a group of virtual spheres corresponding to the same kind of motion (in the present embodiment, the walking motion).

In this regard, the case where the range 101 in which the reachable positions P exist is paved with the plurality of virtual spheres B with the same radius has been described in the present embodiment as an example. However, the method of arranging the virtual spheres is not limited to this, and it maybe configured so that a sphere with a predetermined radius, which centers on each of the reachable positions P, is set to the virtual sphere B, for example.

Further, arrangement of the virtual spheres B may also be one that can cover a movable area of the character C, and it maybe configured so that apart of the plurality of virtual spheres B is arranged to be overlapped, for example. In this case, when the reachable position P is positioned in a portion at which a part of the virtual spheres B is overlapped, it may be configured so that the blend ratio according to the reachable position P is associated with only one of the virtual spheres (for example, one in which a distance from the reachable position P to the central coordinate of its virtual sphere is nearer, or the like), or may be configured so that the blend ratio is associated with both of the virtual spheres B.

Next, the motion generating processing carried out by the image processing apparatus 100 will be described. In this regard, the motion generating processing will also be described using the walking motion of the character C as an example.

Figure 7:
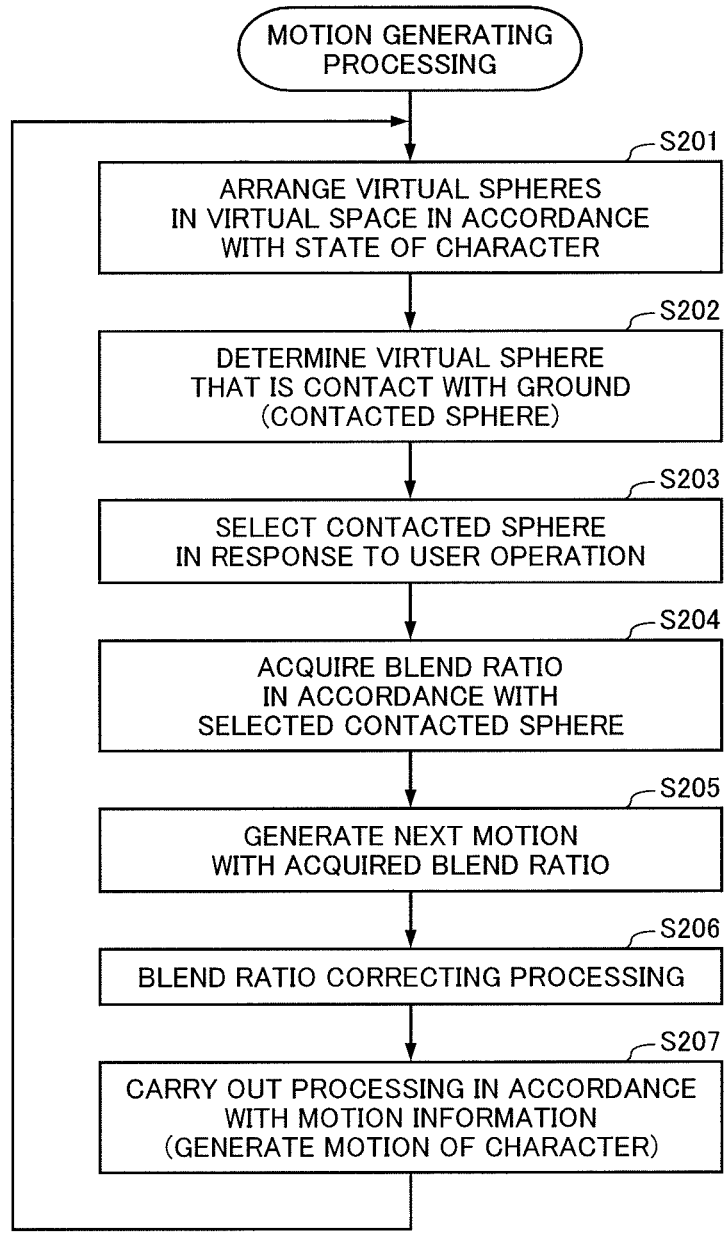
FIG. 7 is a flowchart showing an example of motion generating processing.

FIG. 7 is a flowchart showing an example of motion generating processing that the image processing apparatus 100 carries out as calculation during execution. In the motion generating processing, the control section 11 carries out processing in accordance with the motion information, by which processing to generate a motion of the character C is carried out.

Figure 8:
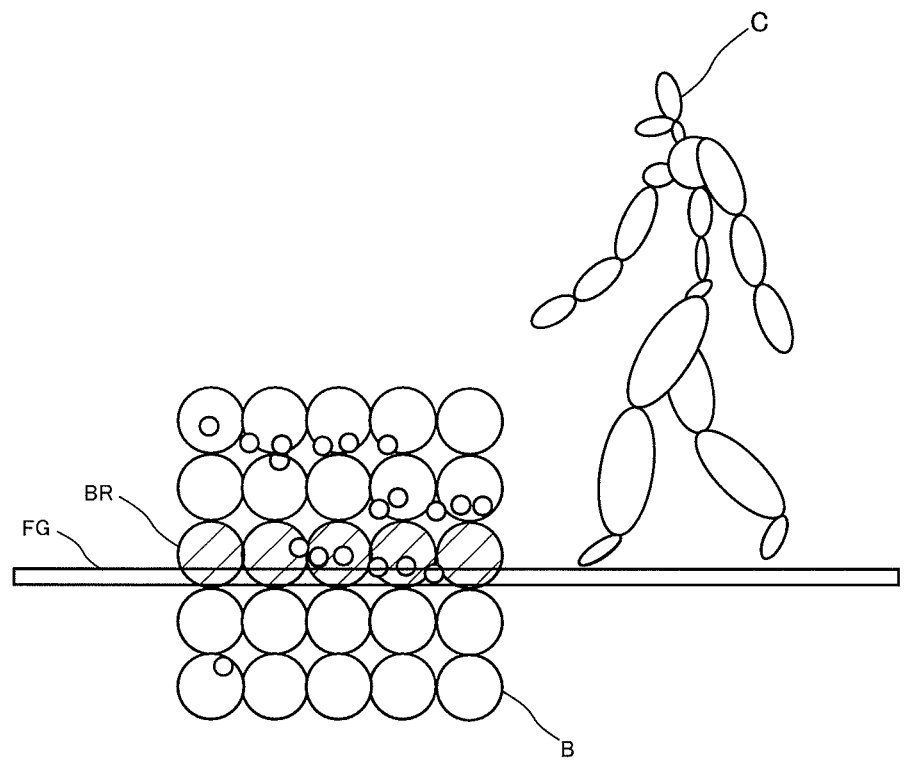
FIG. 8 is an explanatory drawing for explaining the motion generating processing.
Figure 9:
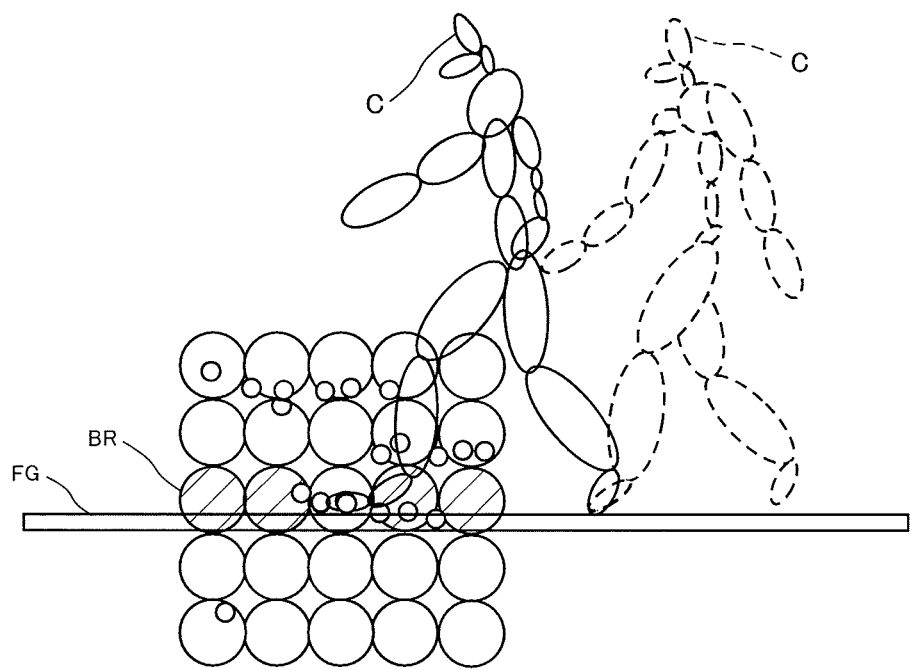
FIG. 9 is an explanatory drawing for explaining the motion generating processing.

Here, a concept of processing carried out in the motion generating processing according to the present embodiment will first be described. FIGS. 8 and 9 are explanatory drawings for explaining the motion generating processing. In this regard, FIGS. 8 and 9 are illustrated by a two-dimensional drawing for brief description.

In order to generate a motion of the character, the image processing apparatus 100 arranges the plurality of virtual spheres B with which the blend ratios are respectively associated in accordance with a position of the character C in the virtual space, as shown in FIG. 8. In this regard, the case where the virtual spheres B with which the blend ratios regarding the walking motion are associated are arranged will be described in the present embodiment as an example. However, the virtual spheres to be arranged are not limited to this type, and they may be a group of virtual spheres with which blend ratios according to various kinds of motions by preliminary calculation are associated.

When the plurality of virtual spheres B are outputted, the image processing apparatus 100 carries out contact determination between a contact allowed object set up as an object with which the character C can come into contact in the virtual space (in the present embodiment, the ground FG) and the virtual sphere B, and calculates a blend ratio for causing the foot of the character C to come into contact with the ground. At this time, the image processing apparatus 100 allows the virtual sphere B, which is in contact with the ground FG in the virtual space, to be differentiated from other virtual spheres B by changing the virtual sphere B into the contacted sphere BR as shown in FIG. 8, for example.

In this case, by utilizing the blend ratio of the motion associated with the contacted sphere BR, such a motion that one foot of the character C is arranged at the central position of each of the virtual spheres can be generated. However, at this stage, an error that corresponds to up to a radius of the contacted sphere BR is generated between the ground FG and the toe position of the character in the virtual space. In order to correct this error, the image processing apparatus 100 takes an approach for semianalytically correcting the blend ratio using a spatial statistics method, so-called kriging, for example.

When the blend ratio is calculated, the image processing apparatus 100 selects a contacted sphere RB in response to an operation by the user, for example, and causes the character C to carry out a motion according to the selected contacted sphere BR, as shown in FIG. 9, thereby generating the motion of the character C. In this regard, the image processing apparatus 100 may be configured so as to select the contacted sphere RB that meets a selection condition set up in advance (for example, it is in the nearest position from the character C).

In this regard, the "generate a motion" herein means that motion information indicating an action of the character C is generated, and also means that an action of the character C is produced.

Next, an operation of the image processing apparatus 100 in the motion generating processing will be described (see FIG. 7).

In the motion generating processing, the control section 11 refers to the virtual sphere information storage section 12c, and arranges virtual spheres according to a state of the character C (a kind of a motion allowed for the character C in the virtual space and the like) in the virtual space (Step S201).

When the virtual spheres are arranged, the control section 11 determines, by means of the contact determining section 16c, whether there is a virtual sphere that is in contact with the ground among the arranged virtual spheres B or not, thereby determining the contacted virtual sphere (contacted sphere) (Step S202). In this regard, in the present embodiment, the contact determining section 16c carries out the contact determination by comparing the ground geometry for displaying the ground in the virtual space with coordinates at which the virtual spheres B exist. Here, the control section 11 sets a contact flag in the virtual sphere information to "1" with respect to the virtual sphere B for which it is determined that it is the contacted sphere by the contact determination.

When the contacted sphere is determined, the control section 11 selects the contacted sphere in accordance with user operations and/or a state of the character C in the virtual space (for example, a velocity instruction or a direction instruction for the character C via the operation receiving section 15) (Step S203).

When the contacted sphere is selected, the control section 11 refers to the virtual sphere information storage section 12c, and acquires the blend ratio associated with the selected contacted sphere (Step S204).

When the blend ratio is acquired, the control section 11 generates, by means of the motion blend section 16a, a walking motion for next one step by means of the acquired blend ratio (Step S205).

In this regard, in the present embodiment, before the walking motion is generated, the control section 11 determines, on the basis of a kind of an action of the character C and the acquired blend ratio, whether motion information indicating a motion that the character C is to carry out has already been stored in the motion information storage section 12b or not. Then, in a case where it is determined that the motion information is stored, the control section 11 generates a walking motion for next one step on the basis of the motion information stored in the motion information storage section 12b (that is, the character C is caused to move in the virtual space).

Namely, in a case where plural kinds of motion information have already been generated when a reachable position P of a foot of the character C for the walking motion is calculated in the virtual sphere information generating processing (see Step S101 in FIG. 3), the control section 11 is not required to generate motion information indicating the walking motion for next one step, and can readout necessary motion information from the motion information storage section 12b on the basis of the acquired blend ratio. On the other hand, in a case where only a part of motions of the character C is blended and the reachable position P is calculated at Step S101 (for example, in a case where only a foot portion of the character C in a plurality of sample motions is blended with a predetermined blend ratio, or the like), the control section 11 newly generates motion information at Step S205. Here, the case where motion information is newly generated will be described as an example.

In this regard, in the present embodiment, the control section 11 registers the motion information, which is newly generated in the motion generating processing, into the motion information storage section 12b.

When the motion information is newly generated, the control section 11 carries out, in order to prevent the toe of the character C from floating from the ground by up to a radius of the virtual sphere, the blend ratio correcting processing by means of the blend ratio correcting section 16d (Step S206). In this regard, it may be configured so that an error between the toe position of the character C and the ground is made smaller by making the radius of the virtual sphere smaller.

When the blend ratio correcting processing is carried out, the control section 11 generates a motion of the character C by carrying out processing according to the motion information after correction (that is, processing to cause the character C to move in the virtual space in accordance with the motion information) (Step S207), and causes it to shift to Step S201.

In this regard, in the present embodiment, the control section 11 specifies the motion information after correction in accordance with blend ratio after correction specified by the blend ratio correcting processing by means of the blend ratio correcting section 16d.

In the present embodiment, the control section 11 generates motion information after correction by blending a plurality of sample motions, which constitute the motion information newly generated, with the blend ratio after correction specified by the blend ratio correcting processing. In this regard, it maybe configured so that the control section 11 searches the motion information according to the blend ratio specified by the blend ratio correcting processing from the motion information storage section 12b.

In this regard, although the processing during the walking motion of the character has been explained in the embodiment described above, it is possible to carry out appropriate motion expression by carrying out contact determination using virtual spheres in a similar manner with respect to processing regarding contact of a tip of a hand in a motion when the character climbs up a wall, for example. Further, by appropriately adjusting a size of the virtual sphere, it can be applied to a motion, such as a swimming motion, in which clear collision with an environment does not occur, for example.

As explained above, in the embodiment described above, the image processing apparatus 100 that generates a motion of the character by controlling an action of the character in a virtual space is configured so that: the image processing apparatus 100 includes the sample motion information storage section 12a that stores the sample motion information therein, the sample motion information indicating a sample motion that serves as a base for a motion of the character C and the motion information storage section 12b that stores the motion information therein, the motion information indicating an action of the character; the motion information is generated by blending plural pieces of the sample motion information stored in the sample motion information storage section 12a with an arbitrary blend ratio; the generated motion information is registered in the motion information storage section 12b; on the basis of the generated motion information, a reachable position P of a predetermined site (for example, toe, a tip of a hand or the like) of the character C is detected at the end of movement when the character C is caused to move; the coordinate information is associated with the blend ratio, the coordinate information indicating the detected reachable position P; the plurality of spheres are arranged within the range in which the reachable position P exists in the virtual space; the virtual spheres B are caused to correspond to the reachable position, the virtual spheres being the arranged spheres; the virtual sphere information is registered in the virtual sphere information storage section 12c for storing the virtual sphere information, the virtual sphere information being information on the virtual spheres B caused to correspond to the reachable position P; the image processing apparatus 100 includes a character controller that controls an action of the character C in the virtual space on the basis of the motion information stored in the motion information storage section 12b; the virtual spheres are outputted in accordance with a state of the character C in the virtual space on the basis of the virtual sphere information stored in the virtual sphere information storage section 12c; it is determined whether there is a virtual sphere (for example, the contacted sphere BR) that is in contact with the contact allowed object (for example, the ground FG in the virtual space) among the outputted virtual spheres, the contact allowed object being an object with which the character C can come into contact; selection of the virtual sphere determined to be in contact with the contact allowed object is received; and the action of the character C is controlled on the basis of the motion information corresponding to the blend ratio (for example, the blend ratios associated with the respective virtual spheres B) associated with the coordinate information, the coordinate information indicating the reachable position P caused to correspond to the virtual sphere for which the selection is received. Therefore, it is possible to express a motion of the character appropriately, and it becomes possible to reduce a processing load in image processing.

Namely, it is configured so as to control the character on the basis of the motion information (that is, the motion information corresponding to the virtual sphere) corresponding to the blend ratio associated with the reachable position caused to correspond to the virtual sphere, which it is determined to be in contact with the contact allowed object among the plurality of spheres virtually arranged in the range in which the reachable position of the predetermined site of the character exists, that is, the virtual sphere that is a sphere caused to correspond to the reachable position. Therefore, it becomes possible to reduce a processing load in image processing for a motion of the character, and it is possible to carry out appropriate motion expression in which the predetermined site of the character is in contact with the contact allowed object appropriately. In this regard, by making a diameter of the virtual sphere be an appropriate length, it becomes possible to substantially surely carry out appropriate motion expression in which it is in contact with the contact allowed object appropriately. The shorter a diameter of the virtual sphere is, the smaller an error is made. Therefore, it is desired to make the diameter shorter as much as possible within the range in which the processing load is allowed.

In this regard, in the embodiment described above, a processing load onto the image processing apparatus 100 for carrying out the processing to output a motion of the character is reduced compared with the case where the motion of the character is outputted by means of a conventional method.

Further, in the embodiment described above, in a case where the image processing apparatus 100 is configured to correct the motion information so that the predetermined site of the character comes into contact with the contact allowed object (for example, the ground FG in the virtual space) and the motion of the character is thereby terminated, it is possible to carry out motion expression of the character so that the predetermined site of the character is in contact with the contact allowed object appropriately, that is, more appropriately.

Further, since the character is controlled using the motion information generated by blending the sample motions, it is possible to ensure readiness, robustness, and calculation efficiency with a certain level against operations of the user with respect to generation of an animation in which the character moves. Therefore, in order to improve naturalness of the animation in a case where a consumer game machine is utilized (that is, in a case where a calculation resource or a memory resource is limited largely), it is possible to optimize a quality of the generated animation and tradeoff of a calculation cost.

Further, it is possible to generate a motion with low visual artifact, such as foot sliding, by reproducing it while switching a large amount of motion data compared with an approach using technique based upon a motion graph or a move tree to generate the motion in response to a user operation or a change in environment. Namely, by utilizing the image processing apparatus 100, it becomes possible to reduce visually significant visual artifact in a cycle motion using the minimum of calculation amount and memory utilization for creating an interactive application.

Further, in the embodiment described above, the image processing apparatus 100 is configured so as to: specify the blend ratio according to the virtual sphere (for example, the contacted sphere BR) for which the selection is received (for example, acquire it from the motion information storage section 12b); correct, on the basis of the coordinate information (of the reachable position P) associated with the specified blend ratio and the position of the contact allowed object (for example, the ground FG in the virtual space) in the virtual space, the blend ratio so that the motion information according to the blend ratio meets a predetermined condition (for example, the toe of the character C is caused to come into contact with the ground accurately); specify the motion information according to the corrected blend ratio (for example, specify the motion information by blending them with the blend ratio after correction specified by the blend ratio correcting processing to generate the motion information after correction); and control the action of the character C on the basis of the specified motion information. Therefore, it is possible to effectively resolve unnaturalness of an action of the character in the virtual space.

Namely, in a case of expressing a scene in which a part of the character is in contact with other object in the virtual space, it becomes possible to prevent, by means of motion control using virtual spheres, a contact error (that is, a distance between the part of the character and other object in the virtual space in a case where the part of the character is not in contact with the other object in the virtual space in which the character and the other object are displayed in spite of the fact that the part of the character is in contact with the other object in calculation) from being generated.

In this regard, it has not been mentioned particularly in the embodiment described above. However, the image processing apparatus 100 may be configured so as to: specify a virtual distance from the reachable position P indicated by the coordinate information associated with the specified blend ratio (for example, the blend ratio according to the selected contacted sphere) to a position of the contact allowed object in the virtual space (for example, the ground FG in the virtual space) (for example, specify a toe position correction vector Δp (will be described later)); specify the amount of correction of the blend ratio required to bring the reachable position P in line with the position of the contact allowed object on the basis of the specified virtual distance (for example, specify a blend ratio correction amount Δw (will be described later)); and correct the blend ratio in accordance with the amount of correction thus specified.

By configuring it in this manner, it is possible to improve a quality of the motion of the character generated using the virtual spheres without an increase in the processing load on the image processing apparatus by increasing the sample motions. Namely, it becomes possible to appropriately correct an error of the motion of the character in the virtual space.

Further, the image processing apparatus 100 may be configured so as to: determine whether a specific condition is met or not (for example, determine whether posture of the character C in the virtual space, a kind of contact allowed object or the like meets the specific condition or not); specify a sample motion that is not contained in the motion information before correction in accordance with a determination result; and correct the blend ratio to be a blend ratio including a ratio of the specified sample motion so that the motion information meets the predetermined condition (for example, the toe of the character C is caused to come into contact with the ground accurately) in a case where the blend ratio of sample motions is corrected by means of contact determination (or collision determination) in the virtual space (that is, in a case where the motion information for controlling the character is corrected by correcting the blend ratio).

Namely, for example, the image processing apparatus 100 may be configured so that the motion information meets the predetermined condition by correcting the blend ratio to indicate a blend ratio of three kinds of sample motions, to which a sample motion for causing a part of the character (for example, a site corresponding to an ankle) to move is added, in a case where the motion for which sample motions indicating two kinds of walking actions are blended is corrected. By configuring it in this manner, it becomes possible to enable fine adjustment of a motion.

In this regard, although the case where the blend ratios are respectively associated with the virtual spheres has been described in the embodiment described above, ones with which the blend ratios are associated are not limited to ones like a sphere. For example, it may be a virtual cube.

In this regard, the case where the image processing apparatus 100 carries out both of the preliminary calculation and the calculation during execution has been explained as an example in the embodiment described above. However, the embodiment of the present invention is not limited to this. For example, it maybe configured as a server-client system in which they are connected via a communication network. In this case, it may be configured so that a server carries out the preliminary calculation and a client (or both of the server and the client cooperatively) carries out the calculation during execution.

In this regard, the case where the image processing apparatus 100 calculates the plurality of reachable positions P in accordance with the rules stored in the storage section 12 in advance; causes the coordinate information to correspond to the calculated reachable positions P; subsequently arranges the plurality of virtual spheres B uniformly; and associates the blend ratios with the respective virtual spheres B on the basis of a positional relationship between the arranged virtual spheres B and the reachable positions P, has been described in the embodiment described above. However, an example of the embodiment according to the present invention is not limited to this.

Namely, it may be configured so that the virtual sphere B is a sphere structure with a radius in a constant range in which the toe position of the character C (that is, the reachable position P) is centered and it is arranged at the toe position of the character C in the motion created with the blend ratio sampled by a proper method, for example. Hereinafter, other example of the virtual sphere information generating processing (see FIG. 3) in this case will be described. In this regard, the present embodiment will also be explained using a walking motion of a humanoid character C as an example.

In the present embodiment, the virtual sphere information generating section 16b calculates the virtual sphere B with a contact frame. Here, the contact frame is a frame in which a foot comes into contact with the ground in a walking motion of the character C. Since simple algorithm using template matching for toe speed is utilized for detection of the contact frame, its explanation is omitted herein.

In the virtual sphere information generating processing, the control section 11 blends, by means of the motion blend section 16a, posture of the character C with various blend ratios in the contact frame.

Subsequently, the control section 11 calculates, by means of the virtual sphere information generating section 16b, a relative toe position of the character C (for example, the posture AC1 of the character C or the like in FIG. 4) with the respective blend ratios by using the toe position of the initial posture FC (see FIG. 4) of the character C as the original position.

When the coordinates of the respective toe positions are calculated, the control section 11 generates, by means of the virtual sphere information generating section 16b, virtual spheres each having a radius r at the coordinates of the calculated relative toe positions (that is, coordinates of the reachable positions P), and assigns a blend ratio w into them. Thus, N pieces of virtual spheres $\{p_i, w_i, r\}$ are generated (N is an arbitrary positive integer).

In this regard, there are some methods as the method of sampling blend ratios. However, in the present embodiment, in order to calculate virtual spheres so as to fill the virtual space with them uniformly, the virtual sphere information generating section 16b takes an approach to calculate the blend ratio by an interpolating method (scattered data interpolation) of randomly arranged data after sampling the toe position. Namely, the virtual sphere information generating section 16b parameterizes posture of the character C in the contact frame using a three-dimensional toe position vector as an indicator. In the present embodiment, the virtual sphere information generating section 16b calculates a blend ratio $w_s$ on the basis of an inputted sampling point $p_s$ using linear interpolating in which the kriging is simplified (see a mathematical formula 1).

[Mathematical Formula 1]

$$\begin{bmatrix} w_1 \\ \vdots \\ w_N \\ \lambda \end{bmatrix} = \begin{bmatrix} \|p_1 - p_1\| & \cdots & \|p_1 - p_N\| & 1 \\ \vdots & \ddots & \vdots & \vdots \\ \|p_N - p_1\| & \cdots & \|p_N - p_N\| & 1 \\ 1 & \cdots & 1 & 0 \end{bmatrix}^{-1} \begin{bmatrix} \|p - p_1\| \\ \vdots \\ \|p - p_N\| \\ 1 \end{bmatrix}$$

However, since interpolating calculation involves an error, a virtual sphere is generated at an actual toe position $p'_i$, and the virtual spheres $\{p'_i, w_i, r\}$ are thereby generated.

By configuring them as described above, it becomes possible to effectively generate a group of motions so as to fill up the virtual space uniformly.

In this regard, the image processing apparatus 100 may be configured so as to cause the blend ratios to correspond to the plurality of virtual spheres by blending the plurality of sample motions with various blend ratios, select and arrange a group of virtual spheres so as to be the closest to uniform arrangement in the motion generating processing.

In this regard, although its explanation has been omitted in the embodiment described above, a method of correcting the blend ratio using a kriging method will be described briefly.

In the present embodiment, the blend ratio correcting section 16d introduces an inverse kinematics (Inverse Kinematics) technology with repetitive data driven. Namely, the blend ratio correcting section 16d first detects a crossover point between a ray vertically extending from the central position of the contacted sphere BR in the virtual space and the ground geometry. Then, a vector from the central position of the contacted sphere BR to the detected crossover point is expressed as a toe position correction vector $\Delta p$. The blend ratio correction amount $\Delta w$ that meets this correction amount is calculated on the basis of a kriging equation. In this regard, "1", which is a final element of a right side vector in the mathematical formula 1 described above, is a constraint condition for summation of the sum of the blend ratios. Namely, by replacing this with "0", a mathematical formula 2 for calculating the blend ratio correction amount $\Delta w$ corresponding to a moving amount $\Delta p$ of an effector position is obtained. In this regard, it may be configured so as to utilize a method of resolving an error using general inverse kinematics.

[Mathematical Formula 2]

$$\begin{bmatrix} \Delta w_1 \\ \vdots \\ \Delta w_N \\ \lambda \end{bmatrix} = \begin{bmatrix} \|p_1 - p_1\| & \cdots & \|p_1 - p_N\| & 1 \\ \vdots & \ddots & \vdots & \vdots \\ \|p_N - p_1\| & \cdots & \|p_N - p_N\| & 1 \\ 1 & \cdots & 1 & 0 \end{bmatrix}^{-1} \begin{bmatrix} \|p + \Delta p - p_1\| \\ \vdots \\ \|p + \Delta p - p_N\| \\ 0 \end{bmatrix}$$

In this regard, there may also be an error in the blend ratio correction amount $\Delta w$ calculated by means of the mathematical formula 2. In such a case, the error still remains even though a difference between the effector and the ground is inputted. In this case, the image processing apparatus 100 maybe configured so as to: multiply a predetermined coefficient under 1.0 by an error vector between the effector and the ground; and correct the error by means of repeated calculation. By configuring it in this manner, repetition based upon analytical calculation is carried out. Therefore, it becomes possible to obtain an excellent property to converge very robust and with a fewer frequency of repetitions.

In this regard, although it has not been mentioned particularly in the embodiment described above, the meaning of the word "character" in the present application is not limited to characters as objects that appear in the video game. It includes various kinds of objects that appear at simulation of physical phenomena or construction of the virtual space, for example. Namely, the present invention allows the processing load on the image processing apparatus to be reduced compared with the case where image processing with the same level is realized in the conventional method not only in a case where the image processing apparatus (for example, the image processing apparatus 100) is utilized for realization of the video game but also in a case where it is utilized in the overall technology fields in regard to computer graphics.

In this regard, although a detailed explanation has been omitted in the embodiment described above, the motion blending according to the present invention means a technology to generate a new intermediate motion clip by blending a few similar sample motion clips. For example, in order to generate a continuous walking motion, it is required that a sample walking motion clip that interpolates is selected and a continuous value optimization problem for calculating the blend ratio is solved. In the conventional method, selection of a sample motion is first simplified by clustering similar actions, such as running and walking, and illustrating them graphically. Moreover, a method of controlling the interpolating calculation by means of a few intuitive parameters using a technology of scattered data interpolating (scattered data interpolation) has been proposed. In the walking motion, the blend ratio is automatically calculated from a few explicit control parameters such as a direction of movement, velocity, an angle of gradient of the ground and the like. Since this method has a smaller amount of calculation, it is possible to generate a walking animation interactively. However, the algorithm based upon interpolating does not necessarily generate an animation with a high quality. For example, since the interpolating calculation involves an error, it is required to correct the motion by means of post-processing such as inverse kinematics. Further, kinetics (dynamics) is not almost always thought in generation calculation. Thus, by allowing some decreases of an animation quality, many excellent properties can be obtained from a blending base method. However, since the conventional technique requires redundant post-processing, there is still room for calculation efficiency and robustness.

Therefore, in the embodiment described above, an interactive walking controller based upon motion blending is proposed.

INDUSTRIAL APPLICABILITY

According to the present invention, it is useful to reduce a processing load of image processing for a motion of a character, and to carry out appropriate motion expression in which a predetermined site of the character is in contact with a contact allowed object appropriately.

EXPLANATION OF REFERENCE NUMERALS 10 program reading section
11 control section
12 storage section
13 display section
14 audio output section
15 operation receiving section
16 motion processing section
100 image processing apparatus

The invention claimed is:

1. An image processing apparatus that generates a motion of a character by controlling an action of the character in a virtual space, the image processing apparatus comprising:
   a sample motion information storage section that stores sample motion information therein, the sample motion information indicating a sample motion that serves as a base for a motion of the character;
   a motion information storage section that stores motion information therein, the motion information indicating an action of the character;
   a motion blender that generates motion information by blending plural pieces of the sample motion information stored in the sample motion information storage section with an arbitrary blend ratio;
   a motion information registerer that registers the motion information generated by the motion blender in the motion information storage section;
   a reachable position detector that detects, on the basis of the motion information generated by the motion blender, a reachable position of a predetermined site of the character at the end of movement when the character is caused to move;
   a blend ratio associator that associates coordinate information with the blend ratio, the coordinate information indicating the reachable position detected by the reachable position detector;
   a virtual sphere arranger that arranges a plurality of spheres in a range in which the reachable position exists in the virtual space;
   a virtual sphere corresponder that causes virtual spheres to correspond to the reachable position, the virtual spheres being the spheres arranged by the virtual sphere arranger;
   a virtual sphere information registerer that registers virtual sphere information in a virtual sphere information storage section for storing the virtual sphere information, the virtual sphere information being information on the virtual spheres caused to correspond to the reachable position by the virtual sphere corresponder; and
   a character controller that controls an action of the character in the virtual space on the basis of the motion information stored in the motion information storage section,
   wherein the character controller includes:
      an outputter that outputs the virtual spheres in accordance with a state of the character in the virtual space on the basis of the virtual sphere information stored in the virtual sphere information storage section;
      a contact determiner that determines whether there is a virtual sphere that is in contact with a contact allowed object among the virtual spheres outputted by the outputter, the contact allowed object being an object with which the character can come into contact; and
      a selection receiver that receives selection of the virtual sphere determined by the contact determiner to be in contact with the contact allowed object, and
   wherein the character controller controls the action of the character on the basis of the motion information corresponding to the blend ratio associated with the coordinate information, the coordinate information indicating the reachable position caused to correspond to the virtual sphere for which the selection receiver receives the selection.

2. The image processing apparatus according to claim 1, wherein the character controller includes:
   a blend ratio specifier that specifies the blend ratio according to the virtual sphere for which the selection receiver receives the selection;
   a blend ratio corrector that corrects, on the basis of the coordinate information associated with the blend ratio specified by the blend ratio specifier and a position of the contact allowed object in the virtual space, the blend ratio so that the motion information according to the blend ratio meets a predetermined condition; and
   a motion information specifier that specifies the motion information according to the blend ratio corrected by the blend ratio corrector,
   wherein the character controller controls the action of the character on the basis of the motion information specified by the motion information specifier.

3. The image processing apparatus according to claim 2, wherein the character controller includes:
   a virtual distance specifier that specifies a virtual distance from the reachable position to the position of the contact allowed object in the virtual space, the reachable position being indicated by the coordinate information associated with the blend ratio specified by the blend ratio specifier; and
   a correction amount specifier that specifies the amount of correction of the blend ratio required to bring the reachable position in line with the position of the contact allowed object on the basis of the virtual distance specified by the virtual distance specifier, and
   wherein the blend ratio corrector corrects the blend ratio in accordance with the amount of correction specified by the correction amount specifier.

4. An image processing method of generating a motion of a character by controlling an action of the character in a virtual space, the processing method comprising:
   motion blend processing for generating motion information by blending plural pieces of sample motion information stored in a sample motion information storage section with an arbitrary blend ratio, sample motion information storage section that stores sample motion information therein, the sample motion information indicating a sample motion that serves as a base for a motion of the character;
   motion information registering processing for registering the motion information generated in the motion blend processing in a motion information storage section, the motion information storage section storing the motion information therein, the motion information indicating an action of the character;

reachable position detecting processing for detecting, on the basis of the motion information generated in the motion blend processing, a reachable position of a predetermined site of the character at the end of movement when the character is caused to move;

blend ratio associating processing for associating coordinate information with the blend ratio, the coordinate information indicating the reachable position detected in the reachable position detecting processing;

virtual sphere arranging processing for arranging a plurality of spheres in a range in which the reachable position exists in the virtual space;

virtual sphere corresponding processing for causing virtual spheres to correspond to the reachable position, the virtual spheres being the spheres arranged in the virtual sphere arranging processing;

virtual sphere information registering processing for registers virtual sphere information in a virtual sphere information storage section for storing the virtual sphere information, the virtual sphere information being information on the virtual spheres caused to correspond to the reachable position in the virtual sphere corresponding processing; and character controlling processing for controls an action of the character in the virtual space on the basis of the motion information stored in the motion information storage section, wherein the character control processing includes:

outputting processing for outputting the virtual spheres in accordance with a state of the character in the virtual space on the basis of the virtual sphere information stored in the virtual sphere information storage section;

contact determining processing for determines whether there is a virtual sphere that is in contact with a contact allowed object among the virtual spheres outputted in the outputting processing, the contact allowed object being an object with which the character can come into contact; and selection receiving processing for receiving selection of the virtual sphere determined in the contact determining processing to be in contact with the contact allowed object, and wherein the action of the character is controlled on the basis of the motion information corresponding to the blend ratio associated with the coordinate information, the coordinate information indicating the reachable position caused to correspond to the virtual sphere for which the selection is received in the selection receiving processing.

5. A non-transitory computer readable medium storing an image processing program of generating a motion of a character by controlling an action of the character in a virtual space, the image processing program causing a computer to execute:

motion blend processing for generating motion information by blending plural pieces of sample motion information stored in a sample motion information storage section with an arbitrary blend ratio, sample motion information storage section that stores sample motion information therein, the sample motion information indicating a sample motion that serves as a base for a motion of the character;

motion information registering processing for registering the motion information generated in the motion blend processing in a motion information storage section, the motion information storage section storing the motion information therein, the motion information indicating an action of the character;

reachable position detecting processing for detecting, on the basis of the motion information generated in the motion blend processing, a reachable position of a predetermined site of the character at the end of movement when the character is caused to move;

blend ratio associating processing for associating coordinate information with the blend ratio, the coordinate information indicating the reachable position detected in the reachable position detecting processing;

virtual sphere arranging processing for arranging a plurality of spheres in a range in which the reachable position exists in the virtual space;

virtual sphere corresponding processing for causing virtual spheres to correspond to the reachable position, the virtual spheres being the spheres arranged in the virtual sphere arranging processing;

virtual sphere information registering processing for registers virtual sphere information in a virtual sphere information storage section for storing the virtual sphere information, the virtual sphere information being information on the virtual spheres caused to correspond to the reachable position in the virtual sphere corresponding processing; and character controlling processing for controls an action of the character in the virtual space on the basis of the motion information stored in the motion information storage section, wherein in the character control processing the image processing program causes the computer to execute:

outputting processing for outputting the virtual spheres in accordance with a state of the character in the virtual space on the basis of the virtual sphere information stored in the virtual sphere information storage section;

contact determining processing for determines whether there is a virtual sphere that is in contact with a contact allowed object among the virtual spheres outputted in the outputting processing, the contact allowed object being an object with which the character can come into contact; and selection receiving processing for receiving selection of the virtual sphere determined in the contact determining processing to be in contact with the contact allowed object, and wherein the image processing program causes the computer to execute:

processing for controlling the action of the character on the basis of the motion information corresponding to the blend ratio associated with the coordinate information, the coordinate information indicating the reachable position caused to correspond to the virtual sphere for which the selection is received in the selection receiving processing.

* * * * *